US005296791A

United States Patent [19]

Hipp

[11] Patent Number: 5,296,791

[45] Date of Patent: Mar. 22, 1994

[54] METHOD AND APPARATUS FOR OPERATING A HOIST

[75] Inventor: William A. Hipp, Brookfield, Wis.

[73] Assignee: Harnischfeger Corporation, Brookfield, Wis.

[21] Appl. No.: 874,149

[22] Filed: Apr. 27, 1992

[51] Int. Cl.[5] .................... H02P 7/67

[52] U.S. Cl. .................... 318/563; 318/808

[58] Field of Search .................... 318/563, 808, 759, 51, 318/701

[56] References Cited

U.S. PATENT DOCUMENTS 3,783,358 1/1974 Krauer .................... 318/701
4,475,631 10/1984 Nomura .................... 318/808
4,698,563 10/1987 Behnke et al. .................... 318/563

*Primary Examiner*—William M. Shoop, Jr.
*Assistant Examiner*—John W. Cabeca
*Attorney, Agent, or Firm*—Richard C. Ruppin

[57] ABSTRACT

A hoist having an alternating current induction motor for rotating the drum of the hoist and an adjustable frequency power supply connected to the motor has a first control connected to the adjustable frequency power supply for directing the power supply to provide power to the motor at a first voltage level at the initiation of a raising operation. A second control is also connected to the adjustable frequency power supply for directing the power supply to provide power to the motor at the initiation of a lowering operation at a second voltage level which is lower than the first voltage level. The voltage level supplied to the hoist at the initiation of a raising operation may comprise a voltage level which is increased by a raising o first voltage boost value above the voltage level that would be applied without the first voltage boost value. At the initiation of a raising operation, the first voltage level may include a first voltage boost value. At the initiation of a lowering operation, the second voltage level is increased by a lowering or second voltage boost value above the voltage level that would be applied without the second voltage boost value during lowering operation. However, the second voltage boost value is smaller than the first voltage boost value.

10 Claims, 2 Drawing Sheets

METHOD AND APPARATUS FOR OPERATING A HOIST

FIELD OF THE INVENTION

This invention relates to hoists having adjustable frequency alternating current drive systems. More particularly, the invention relates to adjustable frequency motor drives for hoists in which the voltage supplied to the motor may be increased or "boosted" at the initiation of a hoist raising or lowering operation.

BACKGROUND OF THE INVENTION

In the operation of hoists, it is highly critical that a high level of torque be immediately available at the initiation of a raising or lowering operation. Without high torque at the initiation of an operation, the load may not lift off the floor or, if suspended, control over it will be lost and it will drop to the floor. The loss of control over the load and its dropping, of course, may result in facility damage and injury to personnel.

Various protective measures for hoists utilizing adjustable frequency drives have been developed to protect against loss of load control or inability to lift a load due to insufficient torque. These include the sensing of hoist motor current and the determination that the current is at a level necessary to produce sufficient load controlling torque before the hoist brake is released as disclosed in U.S. Pat. No. 5,077,508, assigned to the assignee of the present invention. Another protective measure relates to decelerating a motor from frequencies exceeding 60 hertz as rapidly as possible and bringing the hoist to a stop. When decelerating quickly, the motor speed cannot be decreased so rapidly that the torque required from the motor exceeds the breakdown torque capability of the motor during deceleration. A solution for controlling the motor to decelerate as quickly as possible while at the same time producing sufficient torque is disclosed in U.S. patent application Ser. No. 07/726,494, filed Jul. 8, 1991, and assigned to the assignee of the present invention.

Another approach to preventing loss of load control, directed to increasing the torque that the motor is producing at the initiation of a hoist operation, is to increase the voltage supplied to the motor in excess of the voltage level that would normally be supplied by an adjustable frequency power supply at a low frequency start-up. The invention disclosed herein is a improvement in this type of hoist drive operation.

SUMMARY OF THE INVENTION

It is a general object of this invention to provide, in a hoist having an adjustable frequency power supply and an alternating current operating motor, a method and apparatus for selectively increasing the voltage of the power supplied to the motor at the initiation of a hoist operation to thereby increase the torque produced by the motor without providing excessive current to the motor.

The invention is carried out in a hoist having an alternating current induction motor for rotating the drum of the hoist and an adjustable frequency power supply connected to the motor. A first control means is connected to the adjustable frequency power supply for directing the power supply to provide power to the motor at the initiation of a raising operation at a first voltage level. A second control means is also connected to the adjustable frequency power supply for directing the power supply to provide power to the motor at the initiation of a lowering operation at a second voltage level which is lower than the first voltage level The voltage level supplied to the hoist at the initiation of a raising operation may comprise a voltage level which is increased by a raising or first voltage boost value above the voltage level that would be applied without the first voltage boost value.

At the initiation of a raising operation, the first voltage level may include a first voltage boost value. At the initiation of a lowering operation, the second voltage level is increased by a lowering or second voltage boost value above the voltage level that would be applied without the second voltage boost value during lowering operation. However, the second voltage boost value is smaller than the first voltage boost value, and may be as low as zero.

BRIEF DESCRIPTION OF THE DRAWINGS

Further objects and advantages of the invention will appear when taken in conjunction with the accompanying drawings in which.

DETAILED DESCRIPTION OF THE INVENTION

Figure 1:
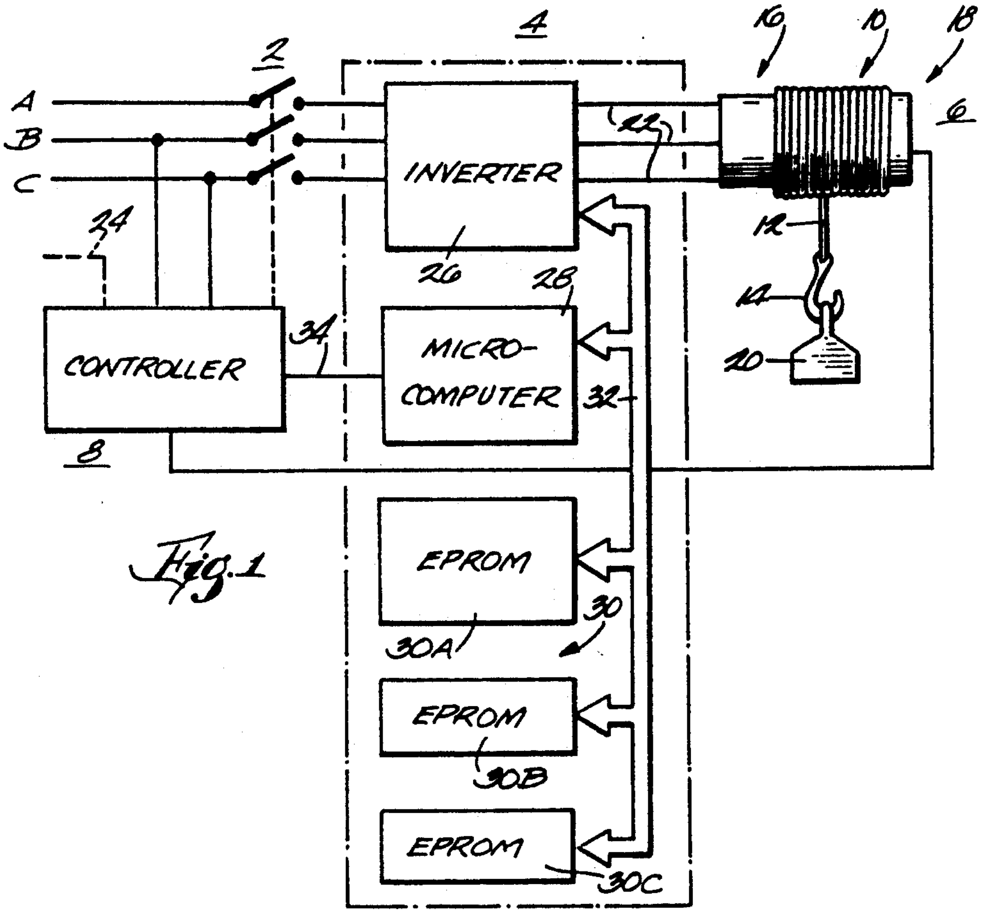
FIG. 1 is a schematic diagram of a hoist having an alternating current motor and an adjustable frequency power supply and control.

Referring generally to FIG. 1, a switch means 2 is illustrated which includes three switch contacts for connecting three phase, 60 hertz power from lines A, B and C to an adjustable frequency power supply 4 which, in turn, provides power to a hoist 6. A controller 8 including an operating lever 24 provides input signals to the power supply 4 for operating the power supply and hoist. The hoist 6 comprises a drum 10, a motor 16 which drives the drum 10, and a brake 18 for stopping or holding the drum 10. A cable 12 has a hook 14 at its lower end and is affixed to the drum 10 and may be wound onto or paid out from the drum 10 to lower or raise an object such as a load 20 carried by the hook. The motor 16 is preferably a three phase squirrel-cage induction type which may, for example, have a rated synchronous speed of 1200 rpm at 60 hertz. An alternating current three phase power supply is provided to the motor 16 on lines 22 from the adjustable frequency power supply 4. The motor 16 drives the drum 10 through gear means (not shown) in a rotational direction to either wind the cable 12 onto the drum 10 and raise the load 20 or pay the cable 12 out from the drum 10 and lower the load 20. The rotational direction of the motor 16 and thereby the raising or lowering of the load 20 is determined by the phase sequence of the three phase power supply on the lines 22. The brake 18 is spring held in a normally applied or on condition and is connected to an appropriate power source through a contact (not shown) in the controller 8 which controls the release of the brake 18. The brake 18 operates to stop and hold the drum 10 from rotating to thereby hold the load 20 suspended when the motor 16 is not operating to raise or lower the load. The switch means 2, the adjustable frequency power supply 4, the hoist 6 and its components, such as the drum 10, motor 16 and brake 18, are all well-known devices and will not be further described herein except as necessary to describe the instant invention.

The adjustable frequency power supply 4 includes an inverter 26, a microcomputer 28 and an EPROM 30 including EPROMs 30A, 30B and 30C, all connected together by a bus 32. Information in digital signal form is transferred between the microcomputer 28, EPROM 30 and inverter 26 on the bus 32. The microcomputer 28 is also connected to the controller 8 via a line 34 representing a number of line electrical connections for transmitting information signals directing the control of the microcomputer 28 and the controller 8. The microcomputer 28 includes a microprocessor, a memory, and input and output units which are well-known types of devices and are not shown, and which receive or transmit information on the bus 32 and lines 34, and process and convert from one form to another the information received to provide control instructions to the inverter 26, EPROM 30, and controller 8 for the operation of the hoist 6.

The EPROM 30 contains a program for controlling the operation of the hoist 6 in conjunction with signals received by the microcomputer 28 from the controller 8 and the inverter 26. The output of the inverter 26 is a three phase selectively variable frequency $F_{out}$ on the lines 22 to the motor 16. The inverter 26 is of a well-known type in which the three phase power input is rectified to full wave direct current power and then converted to three phase alternating current power output at a constant voltage to frequency ratio and at a frequency which may be varied and controlled by input signals from the microcomputer 28. The phase sequence of the alternating current power supply on lines 22, which controls the direction of rotation of the drum 10, is directed by a signal from the controller 8 on the lines 34 to the microcomputer 28.

Figure 2:
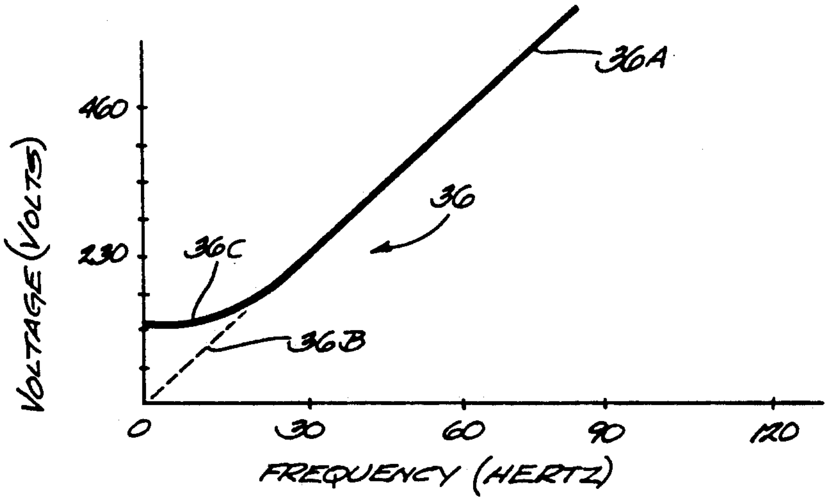
FIG. 2 is a graph of voltage versus frequency for an alternating current motor including a voltage boost portion.

In operating a hoist with an alternating current induction motor supplied from an adjustable frequency power supply, it is normally required that a constant voltage to frequency ratio be maintained in the power supply to the motor. The curve 36 shown in FIG. 2 is illustrative of a typical voltage to frequency relationship. However, the constant V/F ratio of the power supplied to the motor may be modified for various motor operating requirements. One of these requirements in a motor which operates a hoist is that the voltage supplied to the motor at the initiation of a hoist operation must be increased or "boosted" above the voltage level that would normally be supplied to the motor at a low frequency initiation of motor and hoist operation at no load. In FIG. 2, to maintain the constant V/F ratio, the voltage at the low frequency initiation of motor and hoist operation would normally follow the curve portion 36B shown in dashed lines in FIG. 2. At very low frequencies, the curve portion 36B has the same slope as the overall curve 36 and goes to a value at or near 0 at initial low frequency operation. However, since motor torque is the motor torque at initiation of an operation at low frequencies and at the low voltage along curve portion 36B would also be very low. This is a highly undesirable situation in hoist operation since it will not be possible to raise a load from the ground at such low torque values and, if a raising operation is initiated while the load is suspended in the air, inadequate torque at the operation start-up may result in the loss of control over the load and its dropping to the floor. In the initiation of a lowering operation with a load on the hoist, low torque may result in loss of lowering load control and the dropping of the load to the ground. Consequently, it is a common practice in adjustable frequency drive systems which supply power to alternating current motors for operating hoists to boost the voltage to a higher level at the initiation of a hoist operation. A typical voltage increase or boost value is shown by the curve portion 36C in FIG. 2, above the level of the voltage shown by curve portion 36B, for obtaining a higher level of torque at low frequency initiation of a hoist operation. As the frequency of the power supply and speed of the motor subsequently increase, the amount of the voltage boost is decreased to the point where the motor is operating along the voltage-frequency ratio shown by the portion 36A of the curve 36.

Operation of the apparatus is initiated by closing an appropriate switch comprising part of the controller 8 which causes closing of the contacts of switch means 2 and the providing of control power to the controller 8 and the adjustable frequency power supply 4. Alternating three phase power is also provided through the switch means 2 to the inverter 26. The operating lever 24 of the controller 8 may now be moved to command a forward hoist raising operation at a speed, i.e., frequency, selected by the operating person. The frequency may, for example, be up to 120 hertz or approximately a 2400 rpm speed of the motor 16. In response to movement of the lever 24, the controller 8 provides signals on line 34 to the microcomputer 28 indicating the speed and that the forward raising direction is being requested. However, even though a high frequency has been requested, the generation of power by the inverter 26 to the motor 16 at start up will be a low initial frequency $F_{out}$ while the level of the inverter output current is being to determine whether there is an adequate current level to enable a minimum motor torque. If the level of the current is adequate, the output frequency on the lines 22 is increased by the inverter from the initial low frequency $F_{out}$ up to the requested output frequency selected by the operator. In order to ensure that there is the adequate current level prior to release of the brake which continues after release of the brake, voltage boost is applied as generally shown in FIG. 2 such that the motor amperage is at levels such as illustrated by curves 38 and 40 in FIG. 3, depending on the load on the motor and hoist.

Figure 3:
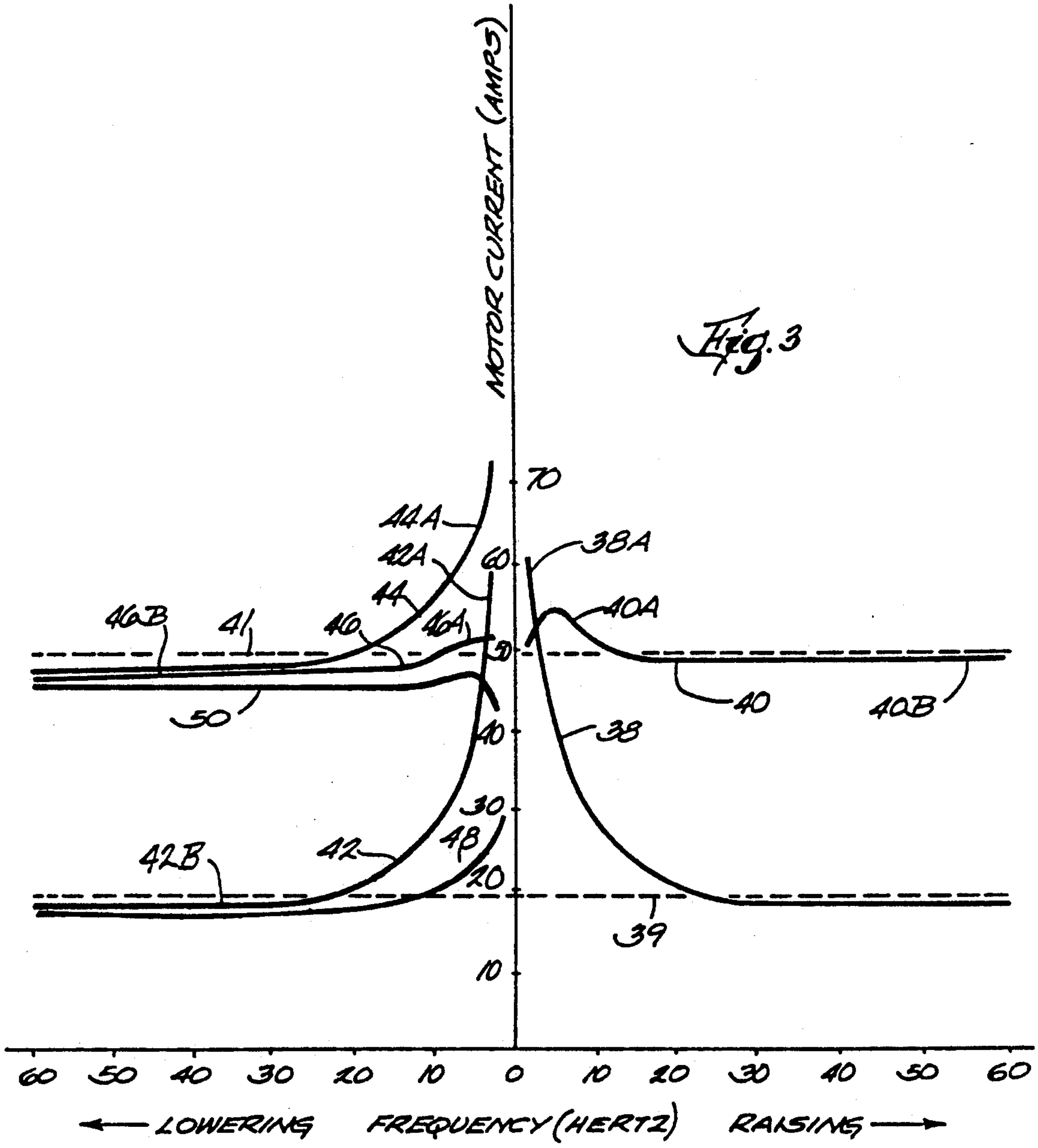
FIG. 3 is a graph of motor current to frequency supplied to the motor for operation of the motor in both a hoist raising and lowering direction.

The curves 38 and 40 in FIG. 3 are for a 40 hp, 1200 rpm motor, having ratings of 460 volts at 60 hertz, full load amps of 49.4 amps, and no load amps of 19.4 amps. For convenient reference purposes, the dashed line 39 shows the motor no load amp level and the dashed line 41 shows the motor full load amp level. The voltage boost value provided by the inverter for operation along the curves 38 and 40 is set at 26 volts to provide a voltage-frequency curve similar to that of curve portions 36C and 36A in FIG. 2. With a load 20 on the hoist such that the motor operates at full load, at a voltage boost of 26 volts and with a minimum initial frequency of 2 hertz supplied to the motor, the initial current as shown by portion 40A of curve 40 has a maximum value of approximately 55 amps, just slightly more than the motor full load current rating. As the frequency supplied to the motor increases, the motor current decreases as shown by portion 40B of curve 40 to a value adjacent to the rated full load current level. With the operation initiating at 2 hertz, a voltage boost of 26 volts and no load on the motor as shown by portion 38A of curve 38, the motor, the motor current begins at a peak of approximately 62 amps and then decreases to a value adjacent to the rated no load motor current level of 19.4 amps. The initial current level of the no load curve 38 in FIG. 3 is somewhat high and causes some excessive heating of the motor. On the other hand the full load curve 40 for a raising operation of FIG. 3, using the same voltage boost as applied when initiating a no load raising operation, produces an initial maximum current close to the motor full load rated at current and therefore causes virtually no overheating. The choice of the voltage boost of 26 volts is a compromise to minimize motor overheating at initiation of a no load operation while at the same time providing full load current and full load rated torque so that the hoist will readily pick up its maximum rated load at the initiation of the raising operation.

If a hoist lowering operation is desired, the operating lever 24 is moved to command the lowering operation and the speed desired. In response to movement of lever 24, the controller 8 provides signals on lines 34 to microcomputer 28 indicating the speed and that a lowering direction is being requested. In response to the lowering request, an instruction requiring the lowering voltage boost value contained in the EPROM 30C is transmitted to the inverter 26 by the microcomputer 28. If the level of the motor current being supplied by the inverter to the motor is adequate, the brake 18 releases and the initial low frequency $F_{out}$ increases toward the frequency necessary for the commanded lowering speed. With respect to the curves 42 and 44 in FIG. 3, if there is no load on the hoist at the initiation of a lowering operation and a voltage boost of 26 volts is applied, the motor current will begin at approximately 62 amps and follow a value along the portion 42A of the curve 42 at initial low frequencies of the power supplied to the motor and decrease to a value adjacent to the rated no load current at portion 42B. If the load 20 on the hoist is equal to the maximum full load of the hoist, and a voltage boost of 26 volts is applied, the motor current will follow the curve 44 along portion 44A at initial low frequencies and decrease in current values to portion 44B adjacent motor full load rated current. However, the initial current level during lowering is quite high at approximately 75 amps and remains above the rated full load current until frequency reaches about 18 hertz, due to the 26 volt voltage boost. At this high value and length of time above full load rated current, and due to the frequent lowering of the hoist with a load, the excessive lowering current causes considerable overheating and resultant motor deterioration.

In order to avoid excessive current and overheating of the motor during lowering operations with a load on the motor, a separate voltage boost control and value or values is provided for lowering operations. In reference to FIG. 1, the voltage boost value provided by the EPROM 30C is a lower value than that provided by EPROM 30B for raising operations. For example, with respect to FIG. 3, the curve 46 represents a graph of motor amps versus frequency during a full load lowering operation at a voltage boost level of 16 volts. The curve 48 represents a lowering operation during no load at a voltage boost value of 16 volts. With respect to curve 46, at the initiation of a full load lowering operation, the initial motor amps at the low start frequency of 2 hertz is 52 amps, just slightly above full load rated amps, as shown by the curve portion of 46A. As the frequency during lowering increases, the current decreases somewhat toward portion 46B of curve 46 adjacent the motor full rated amps of 49.4 amps. As may be appreciated, the very small amount of amperage value above full loaded rated amps and the short time that the current is above full load rated amps at the initial low frequency of the lowering operation with a voltage boost of 16 volts results in virtually no overheating of the motor. Yet, at the same time, the current level is sufficiently high to produce essentially full load rated torque. Using a voltage boost of 16 volts also produces a no load lowering operation curve 48 which, at curve portion 48A, has an initial maximum value of approximately 27 amps and decreases with increasing frequency to adjacent the rated no load amps of amperage of 19.4 amps. No excessive current and motor overheating is involved whatsoever at these low levels.

The motor amps versus frequency curve 50 for a lowering operation at a voltage boost of 10 volts is also shown in FIG. 3. The curve 50 shows a motor amp level at 42 amps at the initial starting frequency, well below the full load rated amperage level. The curve 50, as frequency increases, increases to a higher motor amp level, somewhat less than the full load rated amps. Operation of the motor in a lowering mode according to the curve 50 completely avoids any excess current that might result in any type of overheating, however, the torque value produced at a somewhat low current level, may be less than desired. Nevertheless, in some applications, it may be desirable to operate the motor along a amperage to frequency curve similar to that of curve 50.

Considering again the comparison of curve 44 for a lowering operation with curve 40 for a raising operation, the reason for the higher motor current levels, when the same voltage boost is used for both motor lowering and motor raising operation, is that the IR drop of the motor in the raising direction decreases the air gap voltage and thereby decreases the torque during raising. On the other hand, the IR drop of the motor during the lowering operation in a generating mode, increases the air gap voltage and thereby increases the torque during lowering. Thus, during a raising operation, the current is relatively low at the start so that voltage boost is necessary to increase the current and thereby the torque. During lowering, the IR drop increases the air gap voltage which thereby increases current, flux and torque so that a low or possibly no voltage boost at all is required. Thus, by selecting different voltage boost values at low frequency initiation of hoist and motor raising and lowering operations, torques appropriate for the two different conditions are provided and motor over-current and consequent excessive heating is avoided.

It will be understood that the foregoing description of the present invention is for purposes of illustration only, and that the invention is susceptible to a number of modifications or changes none of which entail any departure from the spirit and scope of the present invention as defined in the hereto appended claims.

What is claimed is:

1. A method of operating a hoist having a rotatable drum, alternating current induction motor coupled to the drum for rotating the drum during raising and lowering operations, and an adjustable frequency alternating current power supply connected to the motor comprising the steps of:

selecting a first voltage boost value;

supplying power to the motor from the power supply at the initiation of a raising and a lowering operation at a predetermined minimum frequency; and supplying said power at a voltage level increased by the first voltage boost value above the voltage level that would be applied without the first voltage boost value only during the initiation of a raising operation.

2. The method according to claim 1 comprising the further steps of:

selecting a second voltage boost value smaller than the first voltage boost value; and supplying said power at a voltage level increased by the second voltage boost value above the voltage level that would be applied without the second voltage boost value only during the initiation of a lowering operation.

3. The method according to claim 2 wherein the second voltage boost value is selected at a zero value.

4. The method according to claim 1 wherein the step of selecting the first voltage boost value comprises determining a voltage boost value which will not result in the current of the motor exceeding a first predetermined value.

5. The method according to claim 4 wherein the first predetermined value of the motor current is the rated full load current of the motor at its rated voltage and frequency.

6. The method according to claim 2 wherein the step of selecting the second voltage boost value comprises determining a voltage boost value which will not result in the current of the motor exceeding a second predetermined value.

7. The method according to claim 6 wherein the second predetermined value of the motor current is the rated full load current of the motor at its rated voltage and frequency.

8. A hoist for performing raising and lowering operations and including a rotatable drum, an alternating current induction motor coupled to the drum for rotating the drum during raising and lowering operations, and an adjustable frequency power supply connected to the motor comprising:

first control means connected to the adjustable frequency power supply for directing the power supply to provide power to the motor at the initiation of a raising operation at a first voltage level; and second control means connected to the adjustable frequency power supply for directing the power supply to provide power to the motor at the initiation of a lowering operation at a second voltage level less than the first voltage level.

9. The hoist according to claim 8 wherein the first voltage level comprises the sum of a first boost voltage and a normal voltage value sufficient for the motor to rotate the drum and operate the hoist in a raising direction when the hoist is not performing a load raising operation.

10. The hoist according to claim 9 wherein the second voltage level comprises only a normal voltage value sufficient for the motor to rotate the drum and operate the hoist in a lowering direction when the hoist is not performing a load lowering operation.

* * * * *